(12) United States Patent
Maassen et al.

(10) Patent No.: US 10,822,204 B2
(45) Date of Patent: Nov. 3, 2020

(54) HOOK TERMINATION SYSTEMS AND METHODS FOR ROPES

(71) Applicant: Samson Rope Technologies, Ferndale, WA (US)

(72) Inventors: Gabrielle Ona Maassen, Bellingham, WA (US); Michael John Secrist, Newberg, OR (US); Kurt Robert Newboles, Lynden, WA (US); Gary Anthony Renner, Turner, OR (US)

(73) Assignee: Samson Rope Technologies, Ferndale, WA (US)

( * ) Notice: Subject to any disclaimer, the term of this patent is extended or adjusted under 35 U.S.C. 154(b) by 106 days.

(21) Appl. No.: 16/248,548

(22) Filed: Jan. 15, 2019

(65) Prior Publication Data

US 2019/0218072 A1 Jul. 18, 2019

Related U.S. Application Data

(60) Provisional application No. 62/617,559, filed on Jan. 15, 2018.

(51) Int. Cl.
*B66C 1/34* (2006.01)
*F16B 45/00* (2006.01)

(52) U.S. Cl.
CPC .............. *B66C 1/34* (2013.01); *F16B 45/00* (2013.01)

(58) Field of Classification Search
CPC .................................. F16B 45/00; B66C 1/26
USPC ................... 294/82.17, 82.1, 82.19; 59/93
See application file for complete search history.

(56) References Cited

U.S. PATENT DOCUMENTS

| | | | | |
|---|---|---|---|---|
| 3,501,817 A | * | 3/1970 | Bambenek | B66C 1/36 294/82.19 |
| 3,795,951 A | * | 3/1974 | Ratcliff | B66C 1/34 294/82.1 |
| 3,863,441 A | * | 2/1975 | Kaufmann | F16G 17/00 59/93 |
| 4,121,867 A | * | 10/1978 | Muller | B66C 1/36 294/82.17 |
| 4,149,369 A | * | 4/1979 | Smetz | B66C 1/36 24/116 R |
| 5,851,040 A | * | 12/1998 | Fredriksson | B66C 1/125 294/82.11 |

* cited by examiner

*Primary Examiner* — Paul T Chin
(74) *Attorney, Agent, or Firm* — Michael R. Schacht; Schacht Law Office, Inc.

(57) ABSTRACT

A hook assembly comprises a hook member and a pin assembly. The hook member defines a base portion, a hook, and first and second pin arms. The hook extends from the base portion and defines a first, second, third, and fourth hook portions and a hook opening. First and second lock projections extend from the second hook portion and fourth hook portions to define a lock gap. The hook opening has a first hook opening dimension extending between the second hook portion and the fourth hook portion and a second opening dimension extending between the third hook portion and the lock gap. The first and second pin arms extend from the base portion. The pin assembly engages the first and second pin arms. The first rope segment engages the pin assembly and the second rope segment engages the third hook portion to place the hook assembly under tension.

19 Claims, 3 Drawing Sheets

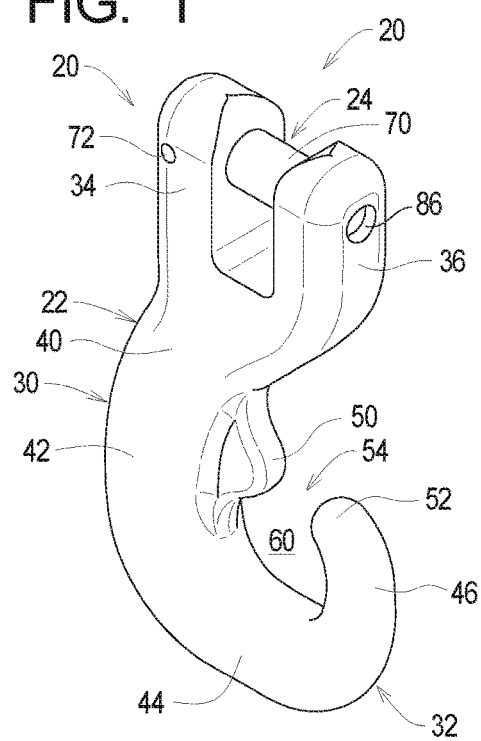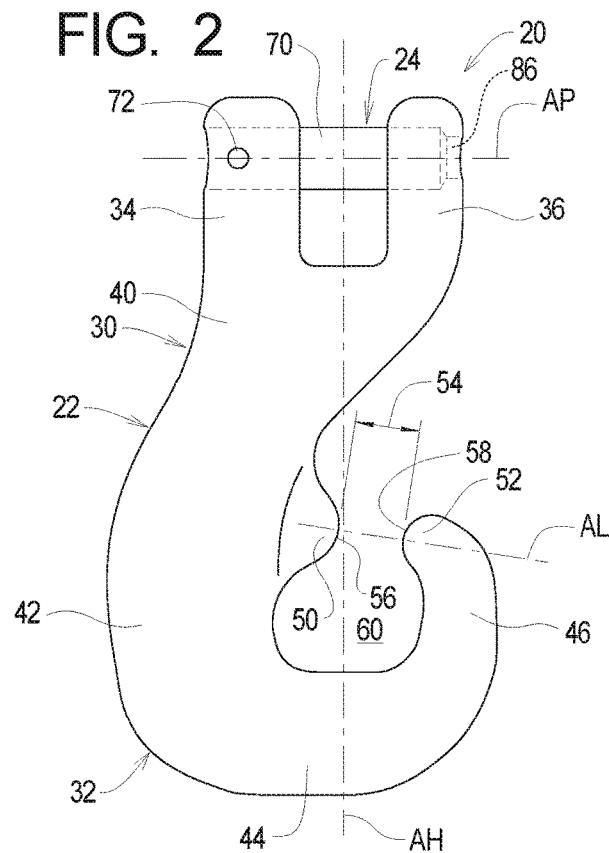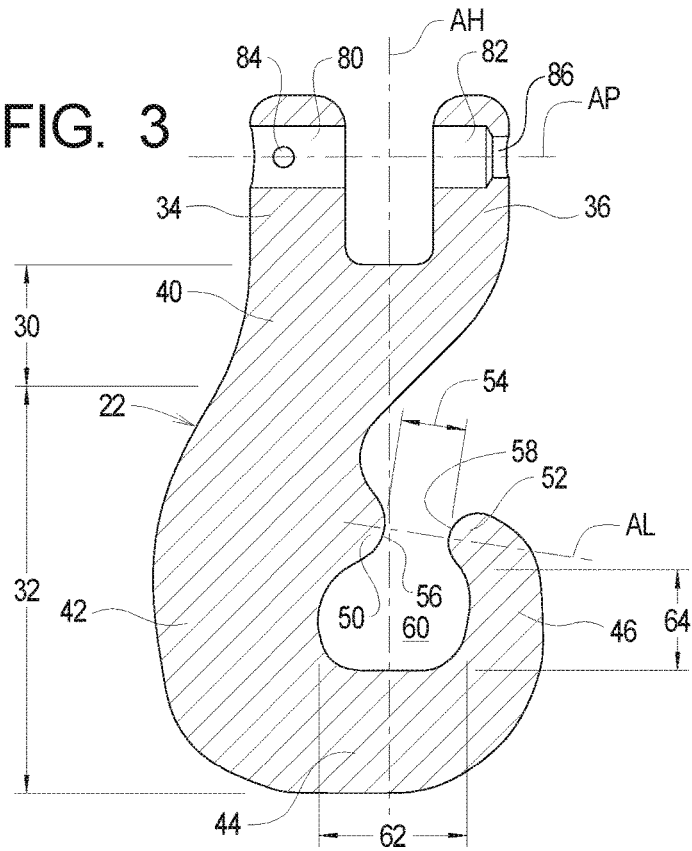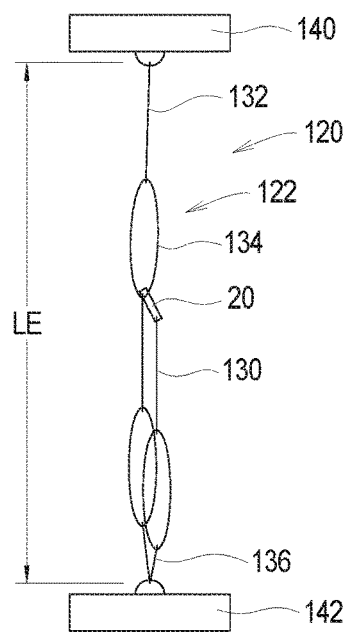
FIG. 1
FIG. 2
FIG. 3
FIG. 4

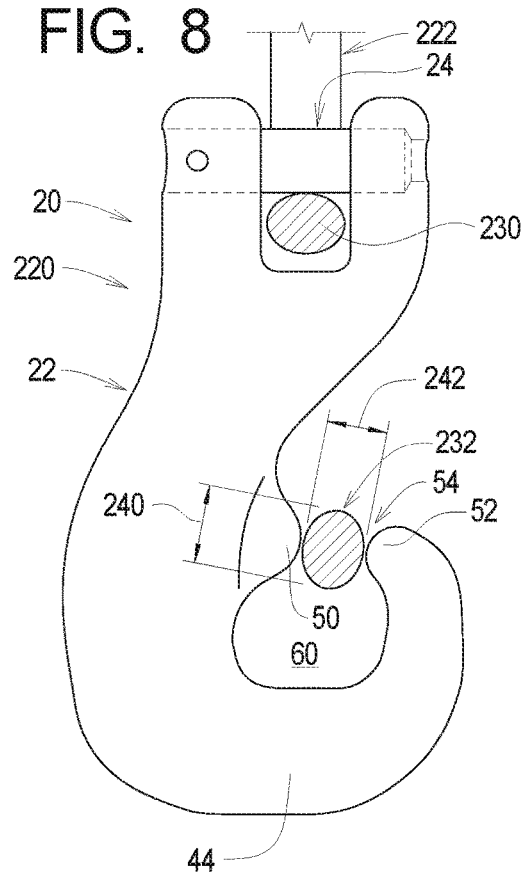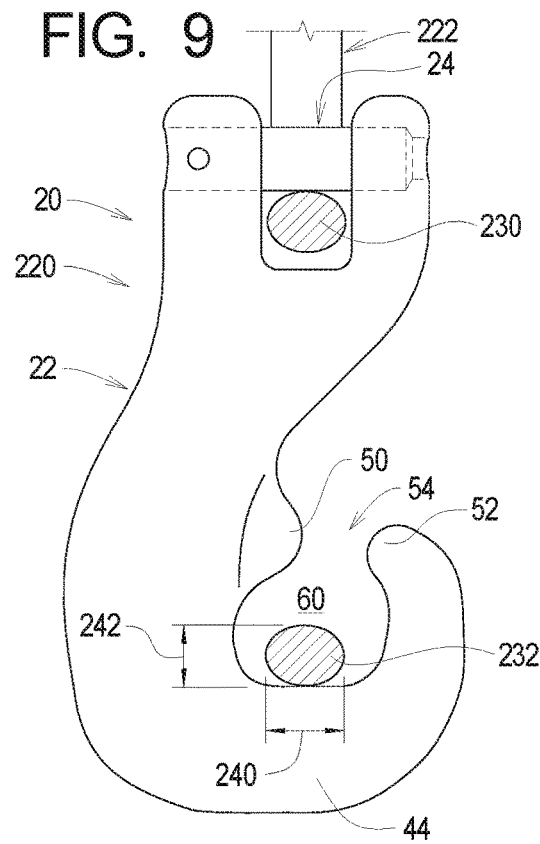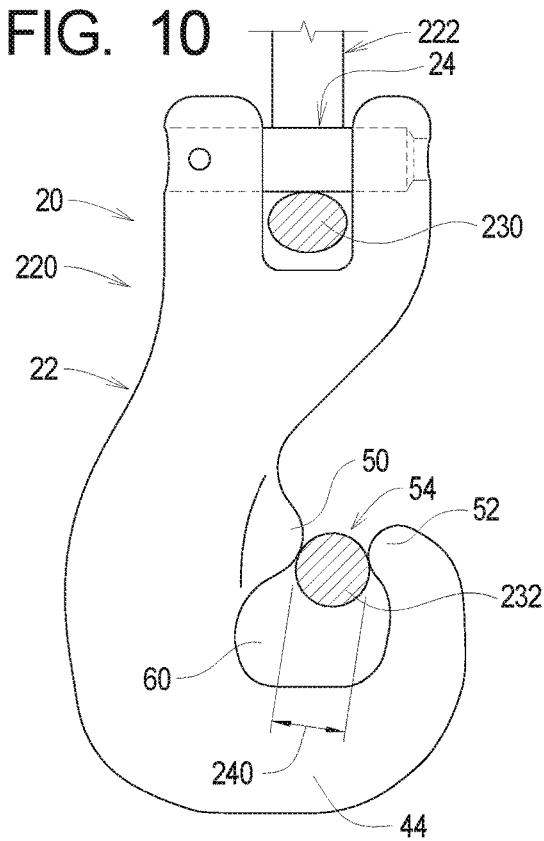

HOOK TERMINATION SYSTEMS AND METHODS FOR ROPES

RELATED APPLICATIONS

This application claims benefit of U.S. Provisional Application Ser. No. 62/617,559 filed Jan. 15, 2018, the contents of which are incorporated herein by reference.

TECHNICAL FIELD

The present invention relates to rope systems and methods and, in particular, to hooks configured to facilitate attachment of a first length of rope to a second length of rope.

BACKGROUND

In industry, the need often exists to quickly and securely attach a first length of rope to a second length of rope. For example, one length of rope (lift rope) may be supported by a hoist or crane, while a second length of rope (load rope) may support a load. Operatively connecting the lift rope to the load rope facilitates lifting and transportation of the load by the hoist or crane. Hooks have long been used to facilitate quick and secure connection of a length of rope to a structural member. The need exists for improved hook termination systems and methods for ropes to a first length of rope to be quickly and securely connected to a second length of rope.

SUMMARY

The present invention may be embodied as a hook assembly for connecting a first rope segment to a second rope segment comprising a hook member and a pin assembly. The hook member defines a base portion, a hook, and first and second pin arms. The hook extends from the base portion and defines a first hook portion, a second hook portion, a third hook portion, a fourth hook portion, and a hook opening. A first lock projection extends from the second hook portion. A second lock projection extends from the fourth hook portion. A lock gap is defined by the first and second lock projections. The hook opening has a first hook opening dimension extending between the second hook portion and the fourth hook portion and a second opening dimension extending between the third hook portion and the lock gap. The first and second pin arms extend from the base portion. The pin assembly is configured to engage the first and second pin arms. The first rope segment engages the pin assembly and the second rope segment engages the third hook portion to place the hook assembly under tension.

The present invention may also be embodied as a rope assembly comprising a first rope segment, a second rope segment, a hook member, and a pin assembly. The hook member defines a base portion, a hook extending from the base portion, the hook defining a first hook portion, a second hook portion, a third hook portion, a fourth hook portion, and a hook opening. A first lock projection extends the second hook portion, a second lock projection extends from the fourth hook portion, and a lock gap is defined by the first and second lock projections. The hook opening has a first hook opening dimension extending between the second hook portion and the fourth hook portion and a second opening dimension extending between the third hook portion and the lock gap. First and second pin arms extend from the base portion. The pin assembly is configured to engage first and second pin arms. The first rope segment engages the pin assembly and the second rope segment engages the third hook portion to place the hook assembly under tension.

The present invention may also be embodied as a method of connecting first and second structural members comprising the following steps. A first end rope segment is operatively connected to the first structural member. The first end rope segment is operatively connected to a second end rope segment with a plurality of intermediate rope segments. A hook member is provided. The hook member defines a base portion, a hook, and first and second pin arms. The hook extends from the base portion and defines a first hook portion, a second hook portion, a third hook portion, a fourth hook portion, and a hook opening. A first lock projection extends from the second hook portion from which a second lock projection extends from the fourth hook portion. A lock gap is defined by the first and second lock projections. The hook opening has a first hook opening dimension extending between the second hook portion and the fourth hook portion and a second opening dimension extending between the third hook portion and the lock gap. The first and second pin arms extend from the base portion. A rope assembly is formed by arranging a pin assembly to engage first and second pin arms and the second end rope segment and engaging the third hook portion with a selected one of the intermediate rope segments. The first end rope segment is connected to the first structural member, and one of the plurality of intermediate rope segments is connected to the second structural member.

BRIEF DESCRIPTION OF THE DRAWINGS

FIG. 1 is a perspective view of a first example rope hook assembly constructed in accordance with, and embodying, the principles of the present invention;

FIG. 2 is a side elevation view of the first example rope hook assembly;

FIG. 3 is a side elevation, section view of the first example rope hook assembly;

FIG. 4 is a side elevation view of a first example rope system incorporating the first example rope hook assembly when in tension between first and second loads;

FIG. 8 is a side elevation view of a second example rope system incorporating the first example rope hook assembly illustrating passage of an intermediate rope portion of the second example rope through a gap defined by a lock projection formed on the first example rope hook assembly;

FIG. 9 is a side elevation view of the second example rope system incorporating the first example rope hook assembly illustrating engagement of the hook with the intermediate rope portion of the second example rope when the second example rope is under tension; and FIG. 10 is a side elevation view of the second example rope system incorporating the first example rope hook assembly illustrating typical engagement of the intermediate rope portion of the second example rope with the lock projection formed on the first example rope hook assembly when the rope is slack.

DETAILED DESCRIPTION

Figure 5:
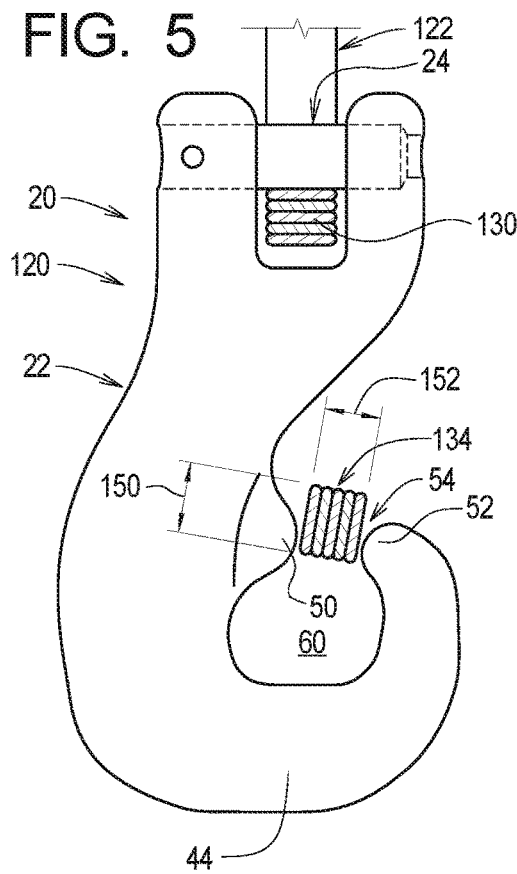
FIG. 5 is a side elevation view of the first example rope system illustrating passage of an intermediate rope portion of the first example rope through a gap defined by a lock projection formed on the first example rope hook assembly.

Referring initially to FIG. 1 of the drawing, depicted therein is an example rope hook assembly 20 constructed in accordance with, and embodying, the principles of the present invention. The example rope hook assembly 20 comprises an example hook member 22 and an example pin assembly 24.

The example hook member 22 is a sold member defining a base portion 30, a hook 32, and first and second pin arms 34 and 36. The example hook 32 defines a first hook portion 40, a second hook portion 42, a third hook portion 44, and a fourth hook portion 46. A first lock projection 50 extends from the second hook portion 42, and a second lock projection 52 extends from the fourth hook portion 46. A lock gap 54 is defined by the first and second lock projections 50 and 52. The length of the example lock gap 54 is the shortest distance between a first point 56 on the first lock projection 50 and a second point 58 on the second lock projection 52. A lock axis AL of the lock gap 54 is defined by a line extending between the first point 56 and the second point 58.

The example hook member 22 further defines a hook main axis AH and a pin axis AP. The example hook 32 generally extends from the base portion 30 in a first direction along the hook main axis AH, while the example first and second pin arms 34 and 36 extend from the body portion 30 in a second direction along the hook main axis AH.

The example first hook portion 40 extends from the base portion 30 at an angle relative to the hook main axis AH. The second hook portion 42 extends at an angle from the first hook portion 40 and along the hook main axis AH away from the body 30. The third hook portion 44 extends at an angle from the second hook portion 42 and crosses the hook main axis AH. The fourth hook portion 46 extends at an angle from the third hook portion 44 and back along the hook main axis AH towards the base portion 30. The first lock projection 50 is arranged on a first side of the hook main axis AH, while the second lock projection 52 is arranged on a second side of the hook main axis AH. The hook main axis AH thus extends through the lock gap 54 defined by the first and second hook projections 50 and 52.

The hook 32 further defines a hook opening 60. The hook opening 60 has a first hook opening dimension 62 extending between the second hook portion 42 and the fourth hook portion 46 and a second hook opening dimension extending between the third hook portion 44 and the lock gap 54. The shape of the hook opening 60 and the first and second hook opening dimensions 62 and 64 are not critical, but the length of the lock gap 54 is preferably shorter than either of the first and second hook opening dimensions 62 and 64.

The example pin assembly 24 comprises a pin 70 and a retainer 72. The first and second pin arms 34 and 36 define first and second pin arm openings 80 and 82, respectively. The first pin arm 34 further defines a retainer opening 84, and the second pin arm 36 defines a pin end opening 86. In use, the pin 70 is inserted at least partly within the first and second pin arm openings 80 and 82 such that the pin 70 extends between the first and second pin arms 34 and 36. The retainer 72 extends through the retainer opening 84 and engages the pin 70 to inhibit removal of the pin 70 from the first pin arm opening 80. The pin assembly 24 thus engages the first and second pin arms 34 and 36 as will be described in further detail below. The pin end opening 86 can be used to facilitate displacement of the pin 70 from the first and second pin arm openings 80 and 82.

Figure 6:
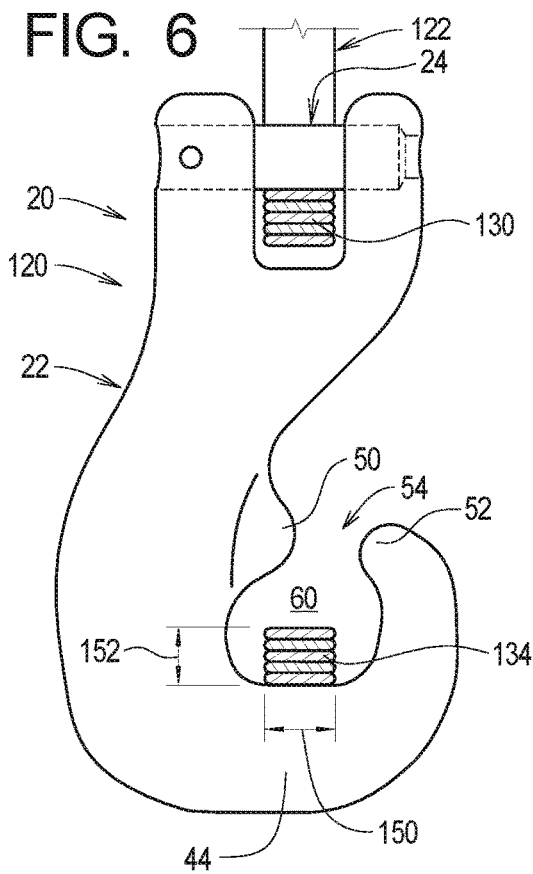
FIG. 6 is a side elevation view of the first example rope system incorporating the first example rope hook assembly illustrating engagement of the hook with the intermediate rope portion of the first example rope when the first example rope is under tension.
Figure 7:
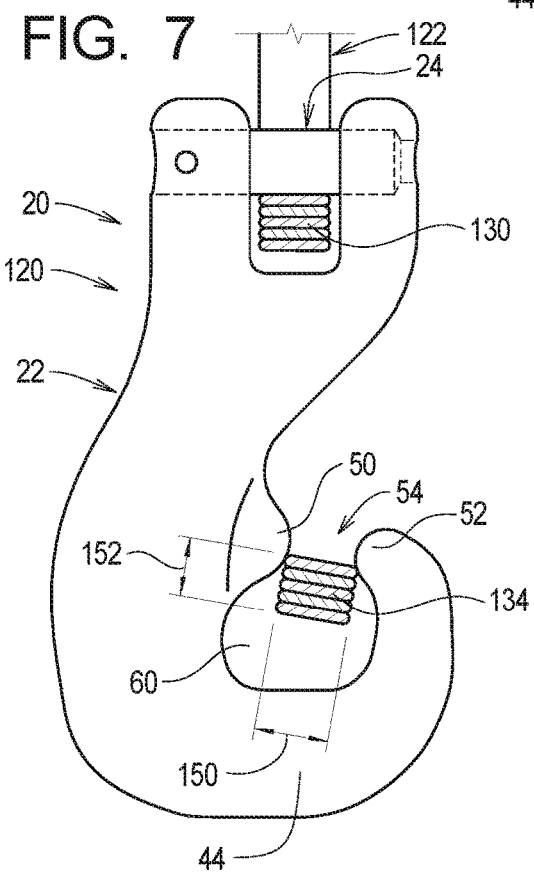
FIG. 7 is a side elevation view of the first example rope system incorporating the first example rope hook assembly illustrating typical engagement of the intermediate rope portion of the first example rope with the lock projection formed on the first example rope hook assembly when the rope is slack.

Turning now to FIGS. 4-7, depicted therein is a first example rope system 120 incorporating the first example hook assembly 20 described above. The first example rope system 120 comprises a rope assembly 122. The example rope assembly 122 is a segmented rope structure comprising a plurality of rope segments including a first end rope segment 130, a second end rope segment 132, a first intermediate rope segment 134, and a second intermediate rope segment 136. In FIGS. 5-7, the section views of the second end rope segment 132 and the first intermediate rope segment 134 show that, in the example rope assembly 122, the segments 132 and 134 are comprised of a plurality of stacked layers such that the segments 132 and 134 have a generally rectangular cross section. However, the principles of the present invention may be implemented with a rope comprising segments with other constructions.

The first end rope segment 130 is operatively coupled to the first example hook assembly 20 using the pin 70. The second end rope segment is operatively connected to a first load 140.

To allow an effective length of the rope assembly 122 to be altered quickly and effectively, the first example hook assembly 20 is hooked onto the first intermediate rope segment 134 as shown in FIG. 5. The effective length LE of the example rope assembly 122 is thus the distance between the second end segment 132 and the second intermediate segment 136. The second intermediate segment 136 may be operatively connected to a second load 142.

In particular, FIGS. 5-7 illustrate that the rectangular cross section of the first intermediate rope segment defines a first dimension 150 and a second dimension 152. The first dimension 150 is slightly larger than the length of the lock gap 54, and the second dimension 152 is slightly smaller than the length of the lock gap 54. By orienting the first intermediate segment 134 such that the second dimension 142 is aligned with the lock gap 54 as shown in FIG. 5, the first intermediate segment 134 can be inserted into the hook opening 60.

Placing the rope assembly 122 under tension as shown in FIG. 4 causes the first intermediate segment 134 to engage the third hook portion 44 of the hook member 22 as shown in FIG. 6. However, should the rope assembly 122 be placed in a slack configuration, the orientation of the first intermediate segment 134 will typically not align with the lock gap 54 as shown in FIG. 7. The first and second lock projections 50 and 52 will thus engage the first intermediate segment 134 such that the first intermediate segment 134 is unlikely to pass through the lock gap 54. Passing of the first intermediate segment 134 through the lock gap 54 requires manual arrangement of the first intermediate segment such that segment dimension 152 thereof is properly aligned with the lock gap 54 as shown in FIG. 5.

The first example hook assembly 20 thus inhibits inadvertent removal of the first intermediate section 134 from the hook opening 60 under most conditions and without use of latches or other movable parts.

Turning now to FIGS. 8-10, depicted therein is a second example rope system 220 incorporating the first example hook assembly 20 described above. The second example rope system 220 comprises a rope assembly 222. The example rope assembly 222 is a segmented rope structure comprising a first end rope segment 230, a second end rope segment (not shown), a first intermediate rope segment 232, and a second intermediate rope segment (not shown). The first end rope segment 224 is operatively coupled to the first example hook assembly 20 using the pin 70. The second end rope segment is operatively connected to a first load (not shown). The example rope segments 230 and 232 forming the second example rope assembly 222 are generally circular when not under tension but can be compressed to define an oval cross-section by pinching or otherwise applying deliberate inward force on opposing portions of the surfaces of the rope segments 230 or 232 when not under tension.

To allow an effective length of the rope assembly 222 to be altered quickly and effectively, the first example hook assembly 20 is hooked onto the first intermediate rope segment 232 as shown in FIG. 5. The effective length of the rope assembly 222 is thus the distance between the second end segment 232 and the second intermediate segment. The second intermediate segment 236 may be operatively connected to a second load as generally described above with respect to the first example rope system 120.

In particular, FIGS. 8-10 illustrates that the first intermediate rope segment 232 can be configured to have a first smallest dimension 240 (FIG. 10) and a second smallest dimension 242 (FIGS. 8 and 9). The first smallest dimension 240 is slightly larger than the length of the lock gap 54, and the second smallest dimension is slightly smaller than the length of the lock gap 54.

By configuring the first intermediate segment 234 to define the second smallest dimension 242 and orienting the first intermediate segment 234 such that the second smallest dimension 242 defined is aligned with the lock gap 54 as shown in FIG. 8, the first intermediate segment 234 can be inserted into the hook opening 60.

Placing the rope assembly 222 under tension then causes the first intermediate segment 234 to engage the third hook portion 44 of the hook member 22 as shown in FIG. 9. However, should the rope assembly 222 be placed in a slack configuration (little or no tension), the first intermediate segment 234 will have the first smallest dimension as shown in FIG. 10. The first and second lock projections 50 and 52 will thus engage the first intermediate segment 234 such that the first intermediate segment 234 is unlikely to pass through the lock gap 54. Passing of the first intermediate segment 234 through the lock gap 54 requires opposing or compression forces to be applied to the surface of the first intermediate segment 234 such that the first intermediate segment 234 defines its first smallest dimension 242 as generally shown in FIG. 8.

The first example hook assembly 20 thus inhibits inadvertent removal of the first intermediate section 234 from the hook opening 60 under most conditions and without use of latches or other movable parts.

Turning now to FIGS. 8-10, depicted therein is a second example rope system 220 incorporating the first example hook assembly 20 described above. The second example rope system 220 comprises a rope assembly 222. The example rope assembly 222 is a segmented rope structure comprising a first end rope segment 230, a second end rope segment (not shown), a first intermediate rope segment 232, and a second intermediate rope segment (not shown). The first end rope segment 230 is operatively coupled to the first example hook assembly 20 using the pin 70. The second end rope segment is operatively connected to a first load (not shown). The example rope segments 230 and 232 forming the second example rope assembly 222 are generally circular when not under tension but can be compressed to define an oval cross-section by pinching or otherwise applying deliberate inward force on opposing portions of the surfaces of the rope segments 230 or 232 when not under tension.

To allow an effective length of the rope assembly 222 to be altered quickly and effectively, the first example hook assembly 20 is hooked onto the first intermediate rope segment 232 as shown in FIG. 8. The effective length of the rope assembly 222 is thus the distance between the second end segment and the second intermediate segment. The second intermediate segment may be operatively connected to a second load as generally described above with respect to the first example rope system 120.

In particular, FIGS. 8-10 illustrate that the first intermediate rope segment 232 can be configured to have a first smallest dimension 240 (FIG. 10) and a second smallest dimension 242 (FIGS. 8 and 9). The first smallest dimension 240 is slightly larger than the length of the lock gap 54, and the second smallest dimension is slightly smaller than the length of the lock gap 54.

By configuring the first intermediate segment 232 to define the second smallest dimension 242 and orienting the first intermediate segment 232 such that the second smallest dimension 242 defined is aligned with the lock gap 54 as shown in FIG. 8, the first intermediate segment 232 can be inserted into the hook opening 60.

Placing the rope assembly 222 under tension then causes the first intermediate segment 232 to engage the third hook portion 44 of the hook member 22 as shown in FIG. 9. However, should the rope assembly 222 be placed in a slack configuration (little or no tension), the first intermediate segment 232 will have the first smallest dimension as shown in FIG. 10. The first and second lock projections 50 and 52 will thus engage the first intermediate segment 232 such that the first intermediate segment 232 is unlikely to pass through the lock gap 54. Passing of the first intermediate segment 232 through the lock gap 54 requires opposing or compression forces to be applied to the surface of the first intermediate segment 232 such that the first intermediate segment 232 defines its second smallest dimension 242 as generally shown in FIG. 8.

The first example hook assembly 20 thus inhibits inadvertent removal of the first intermediate section 232 from the hook opening 60 under most conditions and without use of latches or other movable parts.

What is claimed is:

1. A hook assembly for connecting a first rope segment to a second rope segment comprising:
   a hook member defining
      a base portion,
      a hook extending from the base portion, the hook defining
         a first hook portion,
         a second hook portion from which a first lock projection extends,
         a third hook portion,
         a fourth hook portion from which a second lock projection extends, where a lock gap is defined by the first and second lock projections, and
         a hook opening having
            a first hook opening dimension extending between the second hook portion and the fourth hook portion and
            a second opening dimension extending between the third hook portion and the lock gap, and
      first and second pin arms extending from the base portion; and
   a pin assembly configured to engage the first and second pin arms; wherein the first rope segment engages the pin assembly and the second rope segment engages the third hook portion to place the hook assembly under tension.

2. A hook assembly as recited in claim 1, in which a length of the lock gap is shorter than either of the first hook opening dimension and the second hook opening dimension.

3. A hook assembly as recited in claim 2, in which the second rope segment defines a first dimension and a second dimension, where the first dimension is smaller than the length of the lock gap and the second dimension is larger than the length of the lock gap.

4. A hook assembly as recited in claim 1, in which the second rope segment defines a first dimension and a second dimension, where the first dimension is smaller than a length of the lock gap and the second dimension is larger than the length of the lock gap.

5. A rope assembly comprising:
a first rope segment;
a second rope segment,
a hook member defining
a base portion,
a hook extending from the base portion, the hook defining
a first hook portion,
a second hook portion from which a first lock projection extends,
a third hook portion,
a fourth hook portion from which a second lock projection extends, where a lock gap is defined by the first and second lock projections, and
a hook opening having
a first hook opening dimension extending between the second hook portion and the fourth hook portion and
a second opening dimension extending between the third hook portion and the lock gap, and
first and second pin arms extending from the base portion; and
a pin assembly configured to engage first and second pin arms; wherein
the first rope segment engages the pin assembly and the second rope segment engages the third hook portion to place the hook assembly under tension.

6. A rope assembly as recited in claim 5, in which a length of the lock gap is shorter than either of the first hook opening dimension and the second hook opening dimension.

7. A rope assembly as recited in claim 6, in which the second rope segment defines a first dimension and a second dimension, where the first dimension is smaller than the length of the lock gap and the second dimension is larger than the length of the lock gap.

8. A rope assembly as recited in claim 7, in which the second rope segment defines the first dimension when the rope assembly is under tension.

9. A rope assembly as recited in claim 5, in which the second rope segment defines a first dimension and a second dimension, where the first dimension is smaller than a length of the lock gap and the second dimension is larger than the length of the lock gap.

10. A rope assembly as recited in claim 9, in which the second rope segment defines the first dimension when the rope assembly is under tension.

11. A rope assembly as recited in claim 5, in which the rope assembly comprises first and second end rope segments and at least one intermediate rope segment, in which the first rope segment is formed by the second end rope segment and the second rope segment is formed by one of the at least one intermediate rope segment.

12. A rope assembly as recited in claim 11, in which:
the rope assembly comprises a plurality of intermediate rope segments; and
an effective length of the rope assembly is determined by engaging the hook member with a selected intermediate rope segment of the plurality of intermediate rope segments.

13. A method of connecting first and second structural members, comprising the steps of:
operatively connecting a first end rope segment to the first structural member;
operatively connecting the first end rope segment to a second end rope segment with a plurality of intermediate rope segments;
providing a hook member defining
a base portion,
a hook extending from the base portion, the hook defining
a first hook portion,
a second hook portion from which a first lock projection extends,
a third hook portion,
a fourth hook portion from which a second lock projection extends, where a lock gap is defined by the first and second lock projections, and
a hook opening having
a first hook opening dimension extending between the second hook portion and the fourth hook portion and
a second opening dimension extending between the third hook portion and the lock gap, and
first and second pin arms extending from the base portion; and
forming a rope assembly by
arranging a pin assembly to engage first and second pin arms and the second end rope segment, and
engaging the third hook portion with a selected one of the intermediate rope segments;
connecting the first end rope segment to the first structural member; and
connecting one of the plurality of intermediate rope segments to the second structural member.

14. A method as recited in claim 13, in which a length of the lock gap is shorter than either of the first hook opening dimension and the second hook opening dimension.

15. A method as recited in claim 14, in which the second end rope segment defines a first dimension and a second dimension, where the first dimension is smaller than a length of the lock gap and the second dimension is larger than the length of the lock gap.

16. A method as recited in claim 15, in which the second rope segment defines the first dimension when the rope assembly is under tension.

17. A method as recited in claim 13, in which the second end rope segment defines a first dimension and a second dimension, where the first dimension is smaller than a length of the lock gap and the second dimension is larger than the length of the lock gap.

18. A method as recited in claim 17, in which the second rope segment defines the first dimension when the rope assembly is under tension.

19. A method as recited in claim 13, in which an effective length of the rope assembly is determined by:

identifying a selected intermediate rope segment from the plurality of intermediate rope segments; and engaging the hook member with the selected intermediate rope segment.

* * * * *